United States Patent [19]
Fujiki et al.

[11] Patent Number: 5,666,637
[45] Date of Patent: Sep. 9, 1997

[54] METHOD OF MANUFACTURING CONNECTING ROD

[75] Inventors: Akira Fujiki; Hideaki Kuratomi, both of Kanagawa-ken, Japan

[73] Assignee: Nissan Motor Co., Ltd., Yokohama, Japan

[21] Appl. No.: 739,458

[22] Filed: Oct. 29, 1996

[30] Foreign Application Priority Data

Nov. 9, 1995 [JP] Japan ................................. 7-291411

[51] Int. Cl.$^6$ ................................. B22F 3/26; B22F 5/00
[52] U.S. Cl. ................................. 419/27; 419/28; 419/38; 419/55; 29/DIG. 31
[58] Field of Search ................................. 419/27, 28, 38, 419/55; 29/DIG. 31

[56] References Cited

U.S. PATENT DOCUMENTS 3,658,488  4/1972  Brown et al. ........................... 29/195
5,551,782  9/1996  Arnold et al. .......................... 384/294

Primary Examiner—Charles T. Jordan
Assistant Examiner—Daniel Jenkins
Attorney, Agent, or Firm—Foley & Lardner

[57] ABSTRACT

A method of manufacturing a connecting rod is disclosed, in which a formed body of a connecting rod integrated with a cap section of iron metal powder is heated, before or after being sintered, with a bearing metal ring set in the bearing section thereof. During or after sintering, the bearing metal is infiltrated in the bearing section, followed by the forging as required. Then the cap section is separated. In this way, the manufacturing steps are reduced, while at the same time preventing the bearing section from being overheated and seizured due to an improved heat conductivity between the connecting rod body and the bearing section.

8 Claims, 3 Drawing Sheets

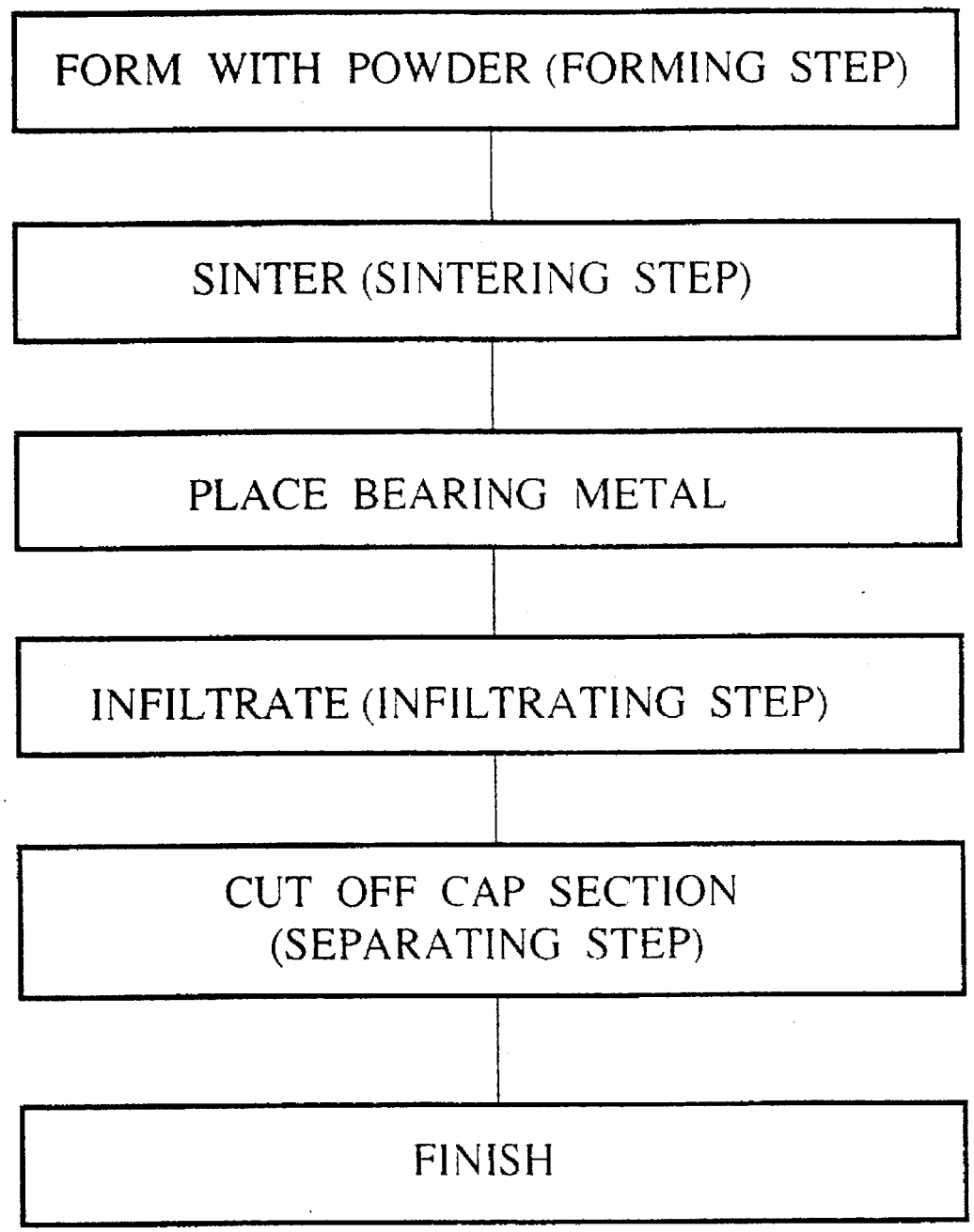

METHOD OF MANUFACTURING CONNECTING ROD

BACKGROUND OF THE INVENTION

The present invention relates to a method of manufacturing a connecting rod for coupling the piston and the crankshaft of an automotive reciprocal engine such as a gasoline engine.

Hot-forged medium carbon steel has been used as a material for a conventional connecting rod. In recent years, however, a high-strength sintered material has come to be used for purposes of reducing the machining steps and the machining margin.

Japanese Patent Laid-Open No. 63-128102, for example, discloses a method of manufacturing a sintered connecting rod, in which a provisional formed body of a bearing section made of bearing metal powder is assembled on a provisional formed body of the connecting rod of metal powder, and the resulting assembly is forged or sintered thereby to produce a sintered connecting rod integrated with the bearing section.

The above-mentioned conventional sintered connecting rod, in which the bearing section is integrated with the connecting rod body, can be easily assembled on the crankshaft. In view of the fact that the sintering or forging step is performed after a provisional formed body of the bearing section is assembled on a provisional formed body of the connecting rod, however, the two provisional formed members cannot be easily set in position relative to each other in the course of manufacture, and an increased number of manufacturing steps is required. Also, the low adherence between the connecting rod body and the bearing section makes it difficult to transfer the heat of the bearing section, thereby leading to the problem of the bearing section being easily overheated. These problems of the connecting rod remain unsolved.

SUMMARY OF THE INVENTION

The present invention has been developed to solve the above-mentioned problems of the conventional sintered connecting rod, and the object thereof is to provide a method of manufacturing, with a small number of manufacturing steps, a sintered connecting rod high in heat conductivity between the connecting rod and the bearing section and capable of preventing the overheating of the bearing section.

In order to achieve the above-mentioned object, according to the present invention, there is provided a method of manufacturing a connecting rod, comprising the steps of forming a formed body of a connecting rod integrated with a cap section by compressing metal powder for the connecting rod, sintering the formed body thereby to form a sintered body, infiltrating the bearing metal in a bearing section by heating the sintered body with the bearing metal set in the bearing section on the large-end side of the sintered body, and separating the cap section.

In the above-mentioned manufacturing method, the formed body of the connecting rod having the integrated cap section of metal powder is sintered, the assembly is heated with the bearing metal set in the bearing section, and the bearing metal is infiltrated in the peripheral edge of the bearing section of the connecting rod. The connecting rod thus is integrated with the bearing metal in the bearing section thereby to form what is called a metal less. Consequently, the heat conductivity of the bearing section is improved so that heat is dissipated easily from the bearing section of the connecting rod body, thereby preventing the bearing section from being overheated and seizured. Also, the bearing metal molten in the infiltration process penetrates the porosities of the sintered body by capillarity. The bearing metal, therefore, is not required to be strictly set in position relative to the bearing section, thereby reducing the positioning steps.

The infiltrating step described above may be replaced by an infiltrate-forging step, infiltrating the bearing metal in the bearing section by heating and forging the sintered body during or after the infiltrating.

In this manufacturing method; the sintered body is forged while being infiltrated on the same step, and therefore the pores in the sintered body is crushed for an increased density of the sintered body. The strength and toughness of the connecting rod can thus be improved.

In place of the sintering and infiltrating steps described above, an infiltrate-sintering step may be provided, infiltrating the bearing metal in the bearing section and sintering the formed body by heating.

In this manufacturing method, the bearing metal is infiltrated and the formed body is sintered successively on the same step by heating. A rational manufacturing step, therefore, is achieved for a lower cost.

Also, the above-mentioned infiltrate-sintering step may be replaced by an infiltrating and sinter-forging step, infiltrating the bearing metal in the bearing section and sinter-forging the formed body by heating.

In this manufacturing method, the formed body of the connecting rod is infiltrated and sinter-forged on the same step. So the succession of infiltrating and sintering reduces the cost on the one hand and the higher density of the sintered body improves the strength and toughness of the connecting rod at the same time.

For infiltrating the bearing metal, bearing metal made of metal powder can be set in the bearing section. This facilitates the adjustment of the amount and composition of the bearing metal.

Further, for infiltrating the bearing metal, an annular bearing metal having an inner diameter approximately equal to the inner diameter of the bearing section of the formed body or the sintered body can be set in the bearing section. In this way, the work of setting the bearing metal is simplified, and the amount of the bearing metal is rendered uniform, thereby preventing variations of the amount of infiltration.

As another alternative, when infiltrating the bearing metal, an annular bearing metal made of a formed body of metal powder can be used. A change in the composition of the infiltrated metal can thus be easily accommodated.

Furthermore, iron metal powder can be used as the metal powder for the connecting rod. Also, the bearing metal infiltrated in the peripheral edge of the bearing section may be made of copper or a copper alloy. As a consequence, not only the strength is improved with a reduced cost, but also the smaller difference in the thermal expansion coefficient between the infiltrated metal and the connecting rod body can prevent the thermal deformation and the generation of minute cracking.

BRIEF DESCRIPTION OF THE DRAWINGS

FIG. 1 is a diagram showing the steps of manufacturing a connecting rod according to a first embodiment of the present invention.

DESCRIPTION OF THE PREFERRED EMBODIMENTS

In the method of manufacturing a connecting rod according to the present invention, a mild bearing metal is infiltrated in the bearing section of a formed body of the connecting rod integrated with a cap of metal powder and forged as required at the time of or after sintering. The metal powder for forming the connecting rod is made of a mixture of black lead and iron metal powder such as Fe—Mn group, Fe—Cr group, Fe—Mn—Cr group, Fe—Cr—Mo group, Fe—Ni—Cr—Mo group, Fe—Ni—Cu group or Fe—Ni—Mo—Cu group, for example. The particle size of the metal powder is 20 to 150 μm. From the viewpoint of infiltration amount of the bearing metal, the forming density is desirably in the range of 6.5 to 7.1 g/cm$^3$. The metal powder is either of the same composition or made of several metal powder of different compositions to produce a mixture of an intended composition.

The bearing metal may be a bearing alloy of tin or zinc or lead group known as white metal, for example, or a copper ally such as Cu—Pb group or Cu—Sn—Pb group, or an aluminum alloy. In the case where the iron metal powder is used for the connecting rod as described above, however, copper or a copper alloy is more desirably used for the bearing metal as it has substantially the same thermal expansion coefficient as the connecting rod body.

The cap can be separated from the large end by machining or other means. The other means is defined as splitting or cutting without machining.

A method of manufacturing a connecting rod according to the present invention will be described specifically with reference to an embodiment.

FIG. 1 is a diagram showing the steps of manufacturing a connecting rod according to a first embodiment of the invention.

Figure 2A:
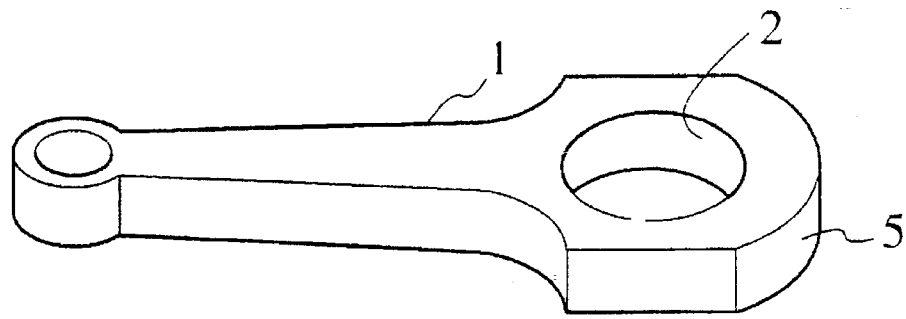
FIG. 2A is a perspective view showing the shape of a connecting rod formed integrally with a cap.

First, the metal powder for a connecting rod is compressed to form a formed body of a connecting rod 1 integrated with a cap section 5 as shown in FIG. 2A (forming step). The raw metal powder used to make up the body of a connecting rod is an atomized iron powder 120 μm or less in particle size containing 4.0% Ni, 2.0% Cu and 0.5% Mo mixed sufficiently with carbon 0.7% by weight and a forming lubricant. The compressive force (forming pressure) of 6 ton/cm$^2$ is applied. The forming density of a formed body 1 of the connecting rod formed under this condition is 6.7 g/cm$^3$.

Figure 2B:
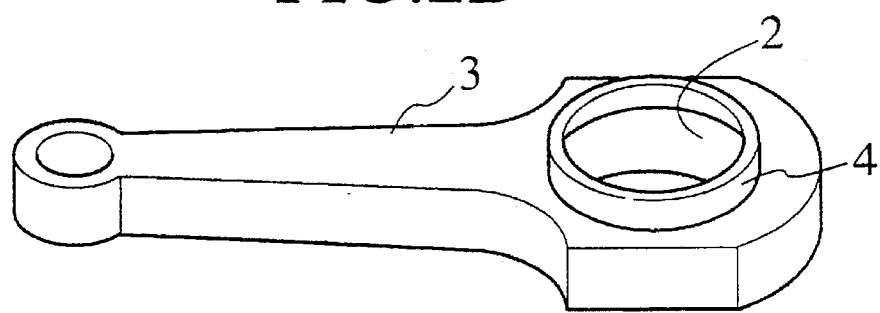
FIG. 2B is a perspective view showing a ring of a bearing metal set in the bearing section of a formed body of the connecting rod sintered.

Then, the formed body of the connecting rod is sintered at 1150° C. for 30 minutes in a N$_2$+H$_2$ gas in a furnace, whereby, as shown in FIG. 2B, a sintered body 3 is formed (sintering step). A ring 4 of the bearing metal of a 65% Cu-35% Pb alloy is set in a bearing section 2 of the large-end side of the sintered body 3, and heated to 600° C. in the furnace. As a result, the Cu—Pb alloy is infiltrated in the peripheral edge of the bearing section 2 (infiltrating step). The ring 4 is a formed body of metal powder having an inner diameter approximately equal to the inner diameter of the bearing section 2.

Figure 2C:
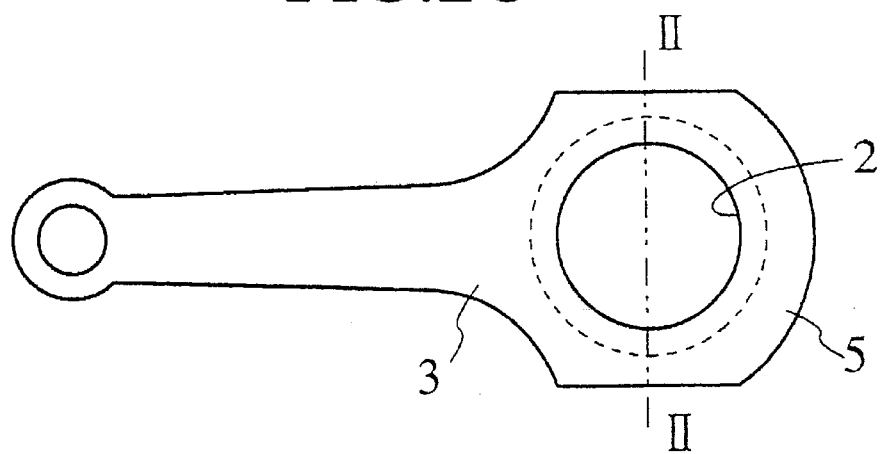
FIG. 2C is a plan view of a connecting rod showing the position in which the cap is cut.

As the next step, as shown in FIG. 2C, the large-end side of the infiltrated sintered body 3 is cut off along the line II—II thereby to separate the cap section 5 (separating step). Finally, the cap section 5 is assembled by bolting and finish ground thereby to complete the connecting rod.

The connecting rod thus completed has the bearing metal (ring 4) and the connecting rod (formed body 1) integrated with each other, thereby forming what is called a metal less. Consequently, the heat conductivity is improved so that the heat of the bearing section 2 is dissipated easily through the connecting rod body 1, thereby making is possible to prevent the bearing section from being overheated and seizured.

The metal molten in the infiltration step penetrates the porosities of the sintered body 3 by capillarity. Strict positioning therefore is not required for setting the bearing metal in the bearing section 2, and therefore the positioning steps are reduced.

Also, since the bearing metal constitutes the ring 4 of a formed body of metal powder, the amount and composition of the bearing metal can be easily regulated, while at the same time easily accommodating the composition change of the infiltrated metal. Further, the work of setting the bearing metal is simplified, with the result that the amount of the bearing metal is rendered constant, thereby preventing variations in the infiltration amount.

Furthermore, the use of iron metal powder for the connecting rod and a copper alloy for the bearing metal leads to the advantage of a higher strength and a lower cost. At the same time, the difference in thermal expansion coefficient between the infiltrated metal and the connecting rod body is reduced, so that the thermal deformation and the minute cracking can be prevented.

In the above-mentioned method of manufacturing a connecting rod, the infiltration step is desirably replaced as required by a infiltrate-forging step for forging the sintered body during or after the infiltration of the bearing metal.

As described above, the forging of the sintered body 3 eliminates the porosities in the sintered body 3 and increases its density. The strength and toughness of the connecting rod are thus improved.

Figure 3:
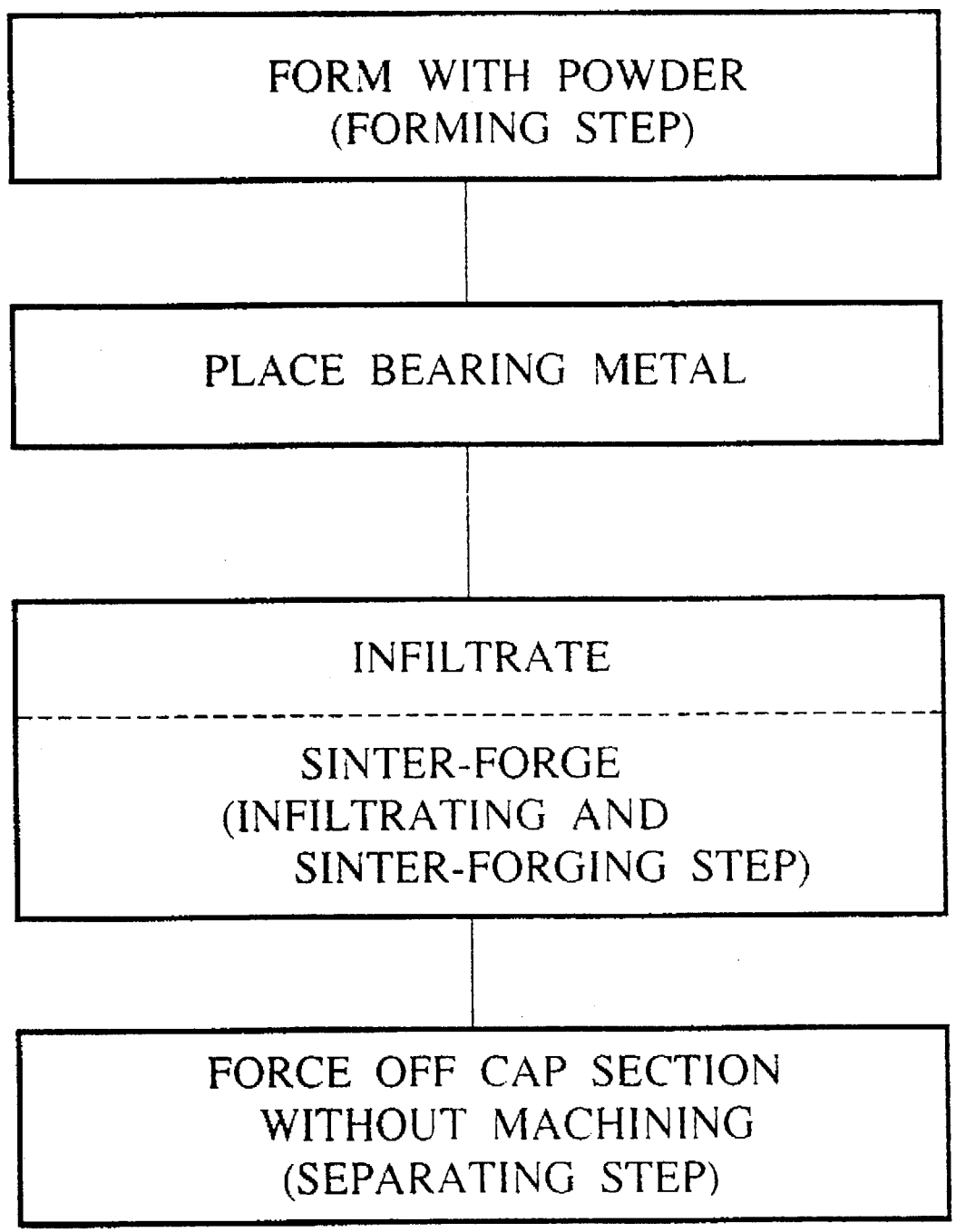
FIG. 3 is a diagram showing the steps of manufacturing a connecting rod according to a second embodiment of the invention.

FIG. 3 is a diagram showing the steps of manufacturing a connecting rod according to a second embodiment of the invention.

The forming step is the same as that of the first embodiment.

The metal powder used for producing a connecting rod is atomized iron powder with a particle size of 80 μm or less containing 2% Ni and 0.5% Cu mixed with 0.6% carbon powder and a forming lubricant. The compressive force (forming pressure) of 5.5 ton/cm$^2$ is applied. The density of the formed body of a connecting rod 1 produced under this condition is 6.5 g/cm$^3$.

A ring 4 of a bearing metal of 65% Cu-35% Pb alloy is set in the bearing section 2 of the formed body of the connecting rod, and headed to 1100° C. in the N$_2$+H$_2$ gas environment in the furnace. In this way, the Cu—Pb alloy is infiltrated in the peripheral edge of the bearing section 2, and sintering the assembly by holding the temperature for 10 minutes, followed by forging (infiltrating and sinter-forging step). The density of the connecting rod obtained as a result of this process is 7.68 g/cm$^3$.

As in the first embodiment, the large-end side of the sintered body 3 infiltrated and forged is separated from the cap section by means without machining (separation step), after which the connecting rod is bolted or otherwise processed as required.

The connecting rod can thus be completed with a fewer number of steps as in the first embodiment. At the same time, the improved heat conductivity due to the integration of the bearing section prevents the overheating and seizure of the bearing section. Further, according to this embodiment, the sintering and infiltrating steps in the first embodiment are replaced by the infiltrating and sinter-forging step, whereby the infiltration, sintering and forging steps can be performed at a time continuously and rationally in a single heating process. The production cost can thus be reduced.

In this case, the forging may be done without (a infiltrate-sintering step may replace the infiltrating and sinter-forging step), depending on the performance required of the connecting rod.

What is claimed is:

1. A method of manufacturing a connecting rod, comprising the steps of:

forming a formed body of a connecting rod integrated with a cap section by compressing metal powder for the connecting rod;

sintering said formed body thereby to form a sintered body;

infiltrating a bearing metal in a bearing section by heating said sintered body with the bearing metal set in the bearing section on the large-end side of the sintered body; and separating said cap section.

2. A method of manufacturing a connecting rod, comprising the steps of:

forming a formed body of a connecting rod integrated with a cap section by compressing metal powder for the connecting rod;

sintering said formed body of the connecting rod thereby to form a sintered body;

infiltrating a bearing metal in a bearing section by heating said sintered body with the bearing metal set in the bearing section at the large-end side of the sintered body, and forging said sintered body during or after the infiltrating; and separating said cap section.

3. A method of manufacturing a connecting rod, comprising the steps of:

forming a formed body of a connecting rod integrated with a cap section by compressing metal powder for the connecting rod;

infiltrating a bearing metal set in a bearing section and sintering said formed body by heating said formed body with the bearing metal set in the bearing section on the large-end side of said formed body; and separating said cap section.

4. A method of manufacturing a connecting rod, comprising the steps of:

forming a formed body of a connecting rod integrated with a cap section by compressing metal powder for the connecting rod for the connecting rod;

infiltrating a bearing metal set in a bearing section and sintering said formed body by heating said formed body with the bearing metal set in the bearing section on the large-end side of said formed body, and forging said formed body during or after the infiltrating and sintering; and separating said cap section.

5. A method of manufacturing a connecting rod according to claim 1, wherein said bearing metal is made of metal powder.

6. A method of manufacturing a connecting rod according to claim 1, wherein said bearing metal is an annular bearing metal having an inner diameter approximately equal to the inner diameter of the bearing section.

7. A method of manufacturing a connecting rod according to claim 6, wherein said annular bearing metal is a formed body of metal powder.

8. A method of manufacturing a connecting rod according to claim 1, wherein said metal powder for the connecting rod is iron metal powder, and said bearing metal is selected one of copper and a copper alloy.

* * * * *